United States Patent [19]
George et al.

[11] 3,923,737
[45] Dec. 2, 1975

[54] ANAEROBIC ADHESIVES

[75] Inventors: Harold M. George, Leeds; Keith Hargreaves, Huby; Paul Wainwright, Horsforth, all of England

[73] Assignee: Rocol Limited, England

[22] Filed: Mar. 15, 1973

[21] Appl. No.: 341,740

[52] U.S. Cl. ............................................. 260/47 UA
[51] Int. Cl.$^2$ ........................................... C08F 7/02
[58] Field of Search .................. 260/47 UA, 89.5 R

[56] References Cited
UNITED STATES PATENTS

| | | | |
|---|---|---|---|
| 3,043,820 | 7/1962 | Krieble | 260/89.5 |
| 3,435,012 | 3/1969 | Nordlander | 260/88.3 |
| 3,682,875 | 8/1972 | O'Sullivan | 260/89.5 R |

FOREIGN PATENTS OR APPLICATIONS

| | | | |
|---|---|---|---|
| 45-15640 | 1/1970 | Japan | 260/47 UA |

*Primary Examiner*—Christopher A. Henderson, Jr.
*Attorney, Agent, or Firm*—Larson, Taylor and Hinds

[57] ABSTRACT

Anaerobically curable compositions comprising a polymerisable polyalkoxy acrylate ester in which the alcohol moiety contains an aromatic group, together with a hydroperoxide as a latent polymerisation catalyst.

6 Claims, No Drawings

ANAEROBIC ADHESIVES

The invention relates to anaerobic adhesives. Such adhesives are compositions of a monomer and a latent initiator or catalyst that remain liquid while in contact with oxygen but polymerise to the solid state when oxygen is excluded. They find particular application in locking nuts, studs and other fasteners, curing readily between metal surfaces.

The invention provides anaerobically curable compositions comprising a polymerisable polyalkoxy acrylate ester, particularly a methacrylate ester, in which the alcohol moiety contains an aromatic group, together with a hydroperoxide as a latent polymerisation catalyst.

The esters may be esters of alkoxylated derivatives of bisphenol A:

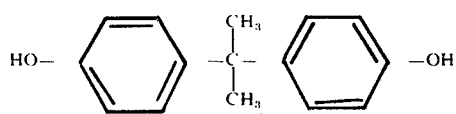

or bisphenol C:

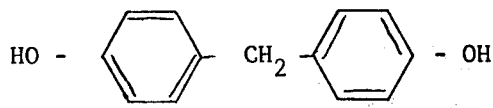

or similar compounds with substituents in the benzene rings, with substituents other than methyl groups on the central carbon atom, or with other aromatic groups, substituted or not, in place of the benzene rings.

Among suitable esters are therefore those that may be generally represented:

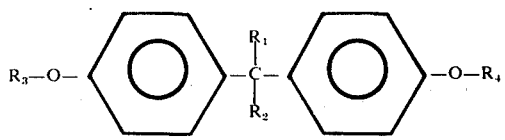

where:
the aromatic groups are benzene rings or other aromatic groups substituted or not;
$R_1$ and $R_2$ represent hydrogen, alkyl, aryl, or hydroxyalkyl groups, or halogen; and
$R_3$ and $R_4$ represent

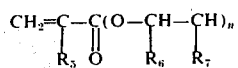

where $n$ is an integer, for example 1 to 20 and preferably 1 to 5, and $R_5$, $R_6$ and $R_7$ represent hydrogen, alkyl or alkoxy groups, or halogen.

Examples of aromatic groups other than benzene are naphthalene, anthracene and other polynuclear groups. The alkyl groups may be methyl, ethyl and other primary, secondary or tertiary alkyl groups and the hydroxyalkyl groups for example, hydroxyethyl. The preferred halogen is chlorine.

A preferred monomer is the dimethacrylate of propoxylated bisphenol A, the number of propoxyl residues in the chain being preferably as above; others are propoxylated bisphenol C dimethacrylate, ethoxylated bisphenol A dimethacrylate, and ethoxylated bisphenol A di-acrylate.

The latent initiator or catalyst for polymerisation is preferably p-menthane hydroperoxide but a wide range of other hydroperoxides is suitable, including for example di-isopropyl benzene hydroperoxide and cumene hydroperoxide.

Preferably the compositions contain also an amine, preferably a primary amine, as an accelerator for the polymerisation. The use of 2-aminopyridine gives particularly good results. Other suitable amines are 4-aminopyridine, 3-aminoquinoline, the N,N-dimethyl derivatives of aniline, 4-nitro-aniline, toluidine and 1-napthylamine, and N,N-diethyl aniline. A wide range of other nitrogen or sulphur containing compounds can however be used as accelerators, including 2,4-dinitrophenol, dodecane-1-thiol, N,N-dimethyl coco amine N-oxide, alpha picoline N-oxide and tris methyl aziridine oxide.

Preferably also a quinone, for example paraquinone (1,4-benzoquinone), is present as a stabiliser for the composition. Other suitable quinones are acenaphthene quinone and 9,10-anthraquinone.

The relative amounts of the various components of the compositions are preferably as follows:
85 to 95 parts of the monomer
4 to 10 parts of the hydroperoxide initiator
1 to 5 parts of the amine, or other accelerator when present
5 to 1000 parts per million, based on the monomer, of the quinone, when present.

The compositions of the invention give good results with anaerobic primers such as isophenone diamine and mixed metallic driers, which greatly reduce curing times.

The invention is illustrated by the following examples.

EXAMPLE 1

A composition was prepared from a commercially available propoxylated (average value of $n =$ ca.1) bisphenol A dimethacrylate containing 7.4% of p-menthane hydroperoxide and 2.6% of 2-amino pyridine, both by weight, related to the dimethacrylate.

On 5/16"diam.1" long bright mild steel B.S.F. nuts and bolts one or two drops of this composition applied before the nut was screwed on gave a finger tight set in an hour and a quarter at 27°C and a fully cured break loose torque of 7 to 10 ft/lb after 72 hours at the same temperature. The nuts and bolts were degreased beforehand in 80°—100° petroleum ether, xylene and 'Genklene' (1,1,1-trichlorethane) successively, and allowed to dry for 20 to 30 minutes.

EXAMPLE 2

The composition of Example 1 was prepared and used on nuts and bolts which had been sprayed with the commercially available primer Locquic T and allowed to dry for 20 minutes. A finger tight set was obtained in 12 minutes, at 27°C as before, from the application of the composition.

The fully cured strength was similar to that in Example 1.

EXAMPLES 3–29

In the Examples 3–28 in Table 1 below 90 parts of commercial propoxylated bisphenol C dimethacrylate, essentially:

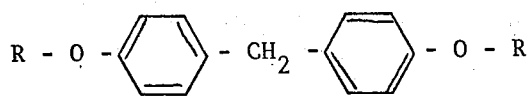

where R is

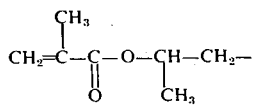

and 500 ppm of 1,4-benzoquinone were made up into compositions with the other materials specified and applied to cleaned nuts and bolts as before.

All these compositions were stable for at least 2 hours at 80°C, indicating long-term storage stability at normal ambient temperatures. Compositions have a shorter life, but are still stable, for up to 3 days at 20°C, when they contain dodecane-1-thiol.

TABLE 1

| Ex. | Parts of p-menthane hydroperoxide | Parts of additive (below) | Fully cured breaking torque in/lb | Hours to finger tight |
|---|---|---|---|---|
| 3 | 9.0 | 1.0 (1) | 95 | Over 6 |
| 4 | 7.4 | 2.6 (1) | 91 | Over 6 |
| 5 | 9.0 | 1.0 (2) | 94 | 2½ |
| 6 | 7.4 | 2.6 (2) | 128 | 3½ |
| 7 | 5.0 | 5.0 (2) | 79 | 1 h. 20 min |
| 8 | 9.0 | 1.0 (3) | 56 | 4½ |
| 9 | 7.4 | 2.6 (3) | 115 | Over 6 |
| 10 | 5.0 | 5.0 (3) | 50 | Over 6 |
| 11 | 9.0 | 1.0 (4) | 83 | Over 6 |
| 12 | 7.4 | 2.6 (4) | 94 | 5¾ |
| 13 | 5.0 | 5.0 (4) | 93 | 2½ |
| 14 | 9.0 | 1.0 (5) | 149 | Over 6 |
| 15 | 7.4 | 2.6 (5) | 123 | 2¾ |
| 16 | 5.0 | 5.0 (5) | 142 | 2¾ |
| 17 | 9.0 | 1.0 (6) | 73 | Over 6 |
| 18 | 7.4 | 2.6 (6) | 13 | Over 6 |
| 19 | 5.0 | 5.0 (6) | 25 | Over 6 |
| 20 | 9.0 | 1.0 (7) | 120 | 1 h. 35 min |
| 21 | 7.4 | 2.6 (7) | 122 | 1 h. 20 min |
| 22 | 5.0 | 5.0 (7) | 119 | 1 h. 40 min |
| 23 | 9.0 | 1.0 (8) | 92 | 4½ |
| 24 | 7.4 | 2.6 (8) | 50 | 3½ |
| 25 | 5.0 | 5.0 (8) | 14 | 2 |
| 26 | 9.0 | 1.0 (9) | 128 | 2¾ |
| 27 | 7.4 | 2.6 (9) | 112 | 2¼ |
| 28 | 5.0 | 5.0 (9) | 102 | 3½ |
| 29 | 7.3 | 0.9+2.5 (10) | 90 | 0 h. 20 min |

Additives:
(1) N,N-dimethyl-4-nitro aniline
(2) N,N-dimethyl toluidine
(3) N,N-dimethyl-1-naphthylamine
(4) N,N-diethyl aniline
(5) N,N-dimethyl aniline
(6) 2,4-dinitro phenol
(7) 2-amino pyridine
(8) dodecane-1-thiol
(9) N,N-dimethyl coco amine N-oxide
(10) tris methyl aziridine oxide and 2-amino pyridine respectively

EXAMPLES 30–41

The examples in Table 2 below, including the results on stability, were as Examples 3—28 except that commercial ethoxylated bisphenol A dimethacrylate was used, essentially:

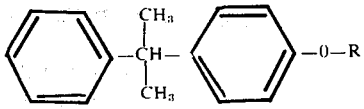

where R is

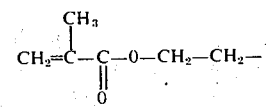

TABLE 2

| Ex. | Parts of p-menthane hydroperoxide | Parts of additive (below) | Fully cured breaking torque in./lb | Hours to finger tight |
|---|---|---|---|---|
| 30 | 9.0 | 1.0 (1) | 159 | 1½ |
| 31 | 7.4 | 2.6 (1) | 139 | 1½ |
| 32 | 5.0 | 5.0 (1) | 137 | 1½ |
| 33 | 9.0 | 1.0 (2) | 110 | 4½ |
| 34 | 7.4 | 2.6 (2) | 66 | 2½ |
| 35 | 5.0 | 5.0 (2) | 45 | 3¾ |
| 36 | 9.0 | 1.0 (3) | 136 | 2½ |
| 37 | 7.4 | 2.6 (3) | 82 | 2½ |
| 38 | 5.0 | 5.0 (3) | 73 | 3½ |
| 39 | 9.0 | 1.0 (4) | 143 | Over 6 |
| 40 | 7.4 | 2.6 (4) | 130 | 3 |
| 41 | 5.0 | 5.0 (4) | 141 | 3 |

Additives:
(1) 2-amino pyridine
(2) dodecane-1-thiol
(3) N,N-dimethyl coco amine N-oxide
(4) N,N-dimethyl aniline

EXAMPLES 42–53

The examples in Table 3 below, including the results on stability, were as Examples 3–28 except that commercial ethoxylated bisphenol A di-acrylate was used, essentially:

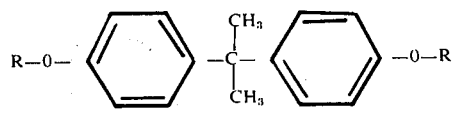

where R is

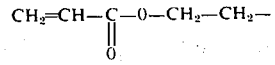

TABLE 3

| Ex. | Parts of p-menthane hydroperoxide | Parts of additive (below) | Fully cured breaking torque in/lb | Hours to finger tight |
|---|---|---|---|---|
| 42 | 9.0 | 1.0 (1) | 69 | 1½ |
| 43 | 7.4 | 2.6 (1) | 70 | 1¾ |
| 44 | 5.0 | 5.0 (1) | 59 | 2 |
| 45 | 9.0 | 1.0 (2) | 40 | 4 |
| 46 | 7.4 | 2.6 (2) | 31 | 3½ |
| 47 | 5.0 | 5.0 (2) | 10 | 2 |
| 48 | 9.0 | 1.0 (3) | 70 | 2¾ |
| 49 | 7.4 | 2.6 (3) | 50 | 2¼ |
| 50 | 5.0 | 5.0 (3) | 61 | 3¾ |
| 51 | 9.0 | 1.0 (4) | 80 | 2½ |
| 52 | 7.4 | 2.6 (4) | 72 | 3 |
| 53 | 5.0 | 5.0 (4) | 91 | 1¾ |

TABLE 3-continued

| Ex. | Parts of p-menthane hydroperoxide | Parts of additive (below) | Fully cured breaking torque in/lb | Hours to finger tight |
|---|---|---|---|---|

Additives
(1) 2-amino pyridine
(2) dodecane-1-thiol
(3) N,N-dimethyl coco amine N-oxide
(4) N,N-dimethyl aniline

EXAMPLES 54—75

In the examples in Table 4 below, as in Examples 30–41, commercial ethoxylated bisphenol A dimethacrylate was used, 90 parts in each case except in Example 74 (89.5 parts) and Example 75 (89.2 parts).

TABLE 4

| Ex. | Parts of hydroperoxide (below) | Parts of quinone (below) ppm | Parts of additives (below) | Fully cured breaking torque in./lb | Time to finger tight | Stability at 80°C (min) |
|---|---|---|---|---|---|---|
| 54 | 7.4 (A) | 50 (I) | 2.6 (1) | 156 | 40 min | 105 |
| 55 | 7.4 (A) | 20 (I) | 2.6 (1) | 117 | 48 min | 64 |
| 56 | 7.4 (A) | 50 (I) | 2.6 (1) | 124 | 50 min | 76 |
| 57 | 7.4 (A) | 100 (I) | 2.6 (1) | 130 | 55 min | 75 |
| 58 | 7.4 (A) | 20 (II) | 2.6 (1) | 115 | 61 min | 58 |
| 59 | 7.4 (A) | 20 (III) | 2.6 (1) | 124 | 54 min | 57 |
| 60 | 7.4 (A) | 50 (III) | 2.6 (1) | 115 | 61 min | 69 |
| 61 | 7.4 (A) | 100 (III) | 2.6 (1) | 110 | 70 min | 105 |
| 62 | 7.4 (B) | 500 (I) | 2.6 (1) | 95 | 3½ h | +120 |
| 63 | 5.0 (B) | 500 (I) | 5.0 (1) | 101 | 2¾ h | +120 |
| 64 | 9.0 (B) | 500 (I) | 1.0 (1) | 110 | 3¼ h | +120 |
| 65 | 7.4 (B) | 100 (I) | 2.6 (1) | 91 | 2¾ h | 75 |
| 66 | 5.0 (B) | 100 (I) | 5.0 (1) | 100 | 2¼ h | 80 |
| 67 | 9.0 (B) | 100 (I) | 1.0 (1) | 87 | 2½ h | 74 |
| 68 | 9.0 (C) | 500 (I) | 1.0 (1) | 102 | 3 h | +120 |
| 69 | 7.4 (C) | 500 (I) | 2.6 (1) | 96 | 3¾ h | +120 |
| 70 | 5.0 (C) | 500 (I) | 5.0 (1) | 103 | 4 h | +120 |
| 71 | 9.0 (C) | 100 (I) | 1.0 (1) | 97 | 3¼ h | 81 |
| 72 | 7.4 (C) | 100 (I) | 2.6 (1) | 101 | 4 h | 90 |
| 73 | 5.0 (C) | 100 (I) | 5.0 (1) | 115 | 3¾ h | 79 |
| 74 | 7.0 (A) | 70 (I) | (2.5 (+ 1.0 (2)) | 210 | 40 min | 95 |
| 75 | 7.3 (A) | 50 (I) | (1.0 (+ 2.5 (3)) | 180 | 75 min | 100 |

Hydroperoxides:
(A) p-menthane hydroperoxide
(B) cumene hydroperoxide
(C) di-isopropyl benzene hydroperoxide
Quinones:
(I) 1,4-benzoquinone
(II) acenaphthene quinone
(III) 9,10-anthraquinone
Additives:
(1) 2-amino pyridine
(2) alpha-picoline N-oxide and 2-amino pyridine respectively
(3) tris methyl aziridine oxide and 2-amino pyridine respectively
(In the stability column '+ 120' stands for 'over 120')

From these examples it can be seen that finger tight curing times of less than 2 hours are given with small quinone concentrations used in conjunction with p-menthane hydroperoxide as the peroxide (these times can be under an hour), or with 2-aminopyridine used in conjunction with p-menthane hydroperoxide and 500 ppm levels of quinone.

These short curing times are an important advantage in some applications.

A further advantage is that a wide variation in fully-cured breaking torque is possible, so that different applications can be catered for.

A particular advantage of the invention is that compositions of a viscosity in the range 350 to 900 centistokes are easily made up. Known compositions are much thinner than this and cannot therefore be used on as wide a range of gap sizes and threads.

The compositions of Example 31 and 34, using ethoxylated bisphenol A dimethacrylate, have for example viscosities of approximately 650 centistokes, and 600 centistokes respectively. The viscosities of the compositions of Examples 54 to 61 are in the range 610 to 758 centistokes.

We claim:
1. A liquid anaerobically curable composition comprising: a polymerizable acrylate ester monomer selected from the group consisting of di-acrylate and dimethacrylate esters of an alkoxylated member selected from the group consisting of ethoxylated bisphenol A, propoxylated bisphenol A, ethoxylated bisphenol C and propoxylated bisphenol C; p-menthane hydroperoxide in an amount sufficient to initiate polymerization of said monomer; 2-amino pyridine in an amount sufficient to accelerate polymerization of said monomer, the amounts of said initiator and accelerator being such that the composition is stable in air but sets when excluded from air.

2. A composition according to claim 1 wherein the monomer is present in an amount of from 85 to 95 parts, the initiator is present in an amount of from 4 to 10 parts and the accelerator is present in an amount of 1 to 5 parts based on the monomer.

3. A composition according to claim 1 wherein the stabilizer is present and comprises p-benzoquinone.

4. A composition according to claim 1 wherein the monomer comprises ethoxylated bisphenol A dimethacrylate.

5. A composition according to claim 1 including 5 to 1,000 ppm of a quinone stabilizer.

6. A composition according to claim 2 including 5 to 1,000 ppm of a quinone stabilizer.

* * * * *